US012767079B2

(12) United States Patent
Sardina

(10) Patent No.: US 12,767,079 B2
(45) Date of Patent: Oct. 20, 2026

(54) MAGNETIC BUMPER SYSTEM FOR A VEHICLE

(71) Applicant: Vela De Vento Corporation, Smithtown, NY (US)

(72) Inventor: Joshua M. Sardina, San Diego, CA (US)

(73) Assignee: Vela De Vento Corporation, Smithtown, NY (US)

( * ) Notice: Subject to any disclaimer, the term of this patent is extended or adjusted under 35 U.S.C. 154(b) by 0 days.

(21) Appl. No.: 18/597,112

(22) Filed: Mar. 6, 2024

(65) Prior Publication Data

US 2025/0282316 A1 Sep. 11, 2025

(51) Int. Cl.
*B60R 21/0134* (2006.01)
*B60R 19/02* (2006.01)
*B60R 21/013* (2006.01)
*B60R 21/0132* (2006.01)

(52) U.S. Cl.
CPC .......... *B60R 21/0134* (2013.01); *B60R 19/02* (2013.01); *B60R 19/023* (2013.01); *B60R 21/013* (2013.01); *B60R 21/0132* (2013.01)

(58) Field of Classification Search
CPC ... B60R 21/0134; B60R 19/02; B60R 19/023; B60R 21/013; B60R 2019/026; B60R 2022/284; B60T 7/22
USPC .......................... 701/301, 525; 180/167, 169
See application file for complete search history.

(56) References Cited

U.S. PATENT DOCUMENTS 3,831,847 A * 8/1974 Serritella ................ B60R 19/02 293/120
5,506,506 A 4/1996 Candy
2004/0130317 A1* 7/2004 Hatanaka ............... G01R 33/07 324/207.2
2006/0041398 A1* 2/2006 Alexander ............. G01D 5/145 702/150

(Continued)

FOREIGN PATENT DOCUMENTS

CN 103057495 A 4/2013
CN 203157902 U 8/2013

(Continued)

OTHER PUBLICATIONS

English translation of CN 116749907 A (Year: 2023).*

(Continued)

*Primary Examiner* — Angela Y Ortiz
*Assistant Examiner* — Aaron K McCullers
(74) *Attorney, Agent, or Firm* — CARTER, DELUCA & FARRELL LLP; George Likourezos

(57) ABSTRACT

A magnetic bumper system for vehicles includes a bumper, a magnet, a sensor, a processor, and a memory. The magnet selectively generates a first magnetic field. The sensor measures a value of a detected magnetic field. The memory causes the system to generate the first magnetic field, and sense a first value of the detected magnetic field. Upon encountering a second magnetic field, the system senses a second value of the detected magnetic field, and determines a difference between the first and second values of the detected magnetic field. If the difference indicates that the pole of the magnetic object nearest to the magnet is the same as the second pole of the magnet, the system stops the magnet from generating the first magnetic field.

20 Claims, 4 Drawing Sheets

(56) References Cited

U.S. PATENT DOCUMENTS

| | | | | |
|---|---|---|---|---|
| 2007/0129881 | A1* | 6/2007 | Chien | G01C 3/06 340/988 |
| 2007/0139175 | A1* | 6/2007 | Servera Serapio | G08G 1/167 340/435 |
| 2007/0188170 | A1* | 8/2007 | Bartington | G01R 33/04 324/253 |
| 2009/0319212 | A1 | 12/2009 | Cech et al. | |
| 2011/0100290 | A1* | 5/2011 | Nakane | B60K 35/60 116/297 |
| 2014/0288883 | A1* | 9/2014 | Hammerschmidt | G01P 3/487 702/187 |
| 2015/0001862 | A1 | 1/2015 | Son | |
| 2020/0003847 | A1* | 1/2020 | Ishida | G01R 33/09 |

FOREIGN PATENT DOCUMENTS

| | | | | | |
|---|---|---|---|---|---|
| CN | 116749907 | A | * | 9/2023 | B60R 21/01 |
| KR | 19980035959 | A | | 8/1998 | |
| KR | 19980077941 | A | | 11/1998 | |
| KR | 20020062864 | A | * | 10/2002 | |
| KR | 20040033648 | A | * | 4/2004 | G08G 1/16 |

OTHER PUBLICATIONS

International Search Report and Written Opinion dated Apr. 24, 2025 issued in International Application No. PCT/US2025/018321(18 pages).

* cited by examiner

MAGNETIC BUMPER SYSTEM FOR A VEHICLE

TECHNICAL FIELD

This disclosure relates generally to a bumper system for a vehicle, in particular, to a magnetic bumper system.

BACKGROUND

Despite advances in vehicle technology, the prevalence of traffic accidents and associated damage continue to persist, exacerbated by an ever-increasing number of drivers on the road. Accidents are often a consequence of human error and miscalculation of reaction time. Because of this, common collision scenarios, such as rear-end accidents in congested traffic or parking lot scrapes, continue to pose challenges to drivers. While traditional passive safety features, including airbags and crumple zones, provide post-impact protection, there are limited proactive measures to mitigate collision risks. Furthermore, existing accident prevention technology, such as autonomous driving, can be costly, inaccurate, and difficult to implement into vehicles.

SUMMARY

An aspect of this disclosure provides a magnetic bumper system for vehicles. The magnetic bumper system includes a bumper, a magnet, a sensor, a processor, and a memory. The magnet selectively generates a first magnetic field. A first pole of the magnet faces the bumper and a second pole of the magnet faces away from the bumper. The sensor measures a value of a detected magnetic field in an area near the magnet. The memory includes instructions stored thereon, which, when executed by the processor cause the system to generate the first magnetic field by the magnet, sense, by the sensor, a first value of the detected magnetic field in the area near the magnet, upon encountering a second magnetic field generated by a magnetic object in the area in proximity to the magnet, sense, by the sensor, a second value of the detected magnetic field, determine a difference between the first value of the detected magnetic field and the second value of the detected magnetic field, if the difference indicates that a pole of the magnetic object nearest to the magnet is the same as the first pole of the magnet, continue to cause the first magnetic field to be generated by the magnet; and if the difference indicates that the pole of the magnetic object nearest to the magnet is the same as the second pole of the magnet, stop the magnet from generating the first magnetic field.

In another aspect of this disclosure, the system may further include a plurality of magnets, each selectively generating a respective magnetic field. A first pole of each magnet of the plurality of magnets may face the bumper and a second pole of each magnet of the plurality of magnets may face away from the bumper. The first pole of each of the plurality of magnets may be the same.

In yet another aspect of this disclosure, the system may further include a plurality of sensors Each sensor of the plurality of sensors may sense a value of a detected magnetic field in an area near a respective magnet of the plurality of magnets, such that each magnet of the plurality of magnets is monitored by at least one sensor of the plurality of sensors.

In a further aspect of this disclosure, each magnet of the plurality of magnets may be caused to generate the respective magnetic field independent from each remaining magnet of the plurality of magnets.

In another aspect of this disclosure, the difference between the first value of the detected magnetic field and the second value of the detected magnetic field may correspond to a change in voltage.

In yet another aspect of this disclosure, the instructions, when executed by the processor may cause the system to stop the generation of the first magnetic field by the magnet if the difference between the first value of the detected magnetic field and the second value of the detected magnetic field is determined to be greater than or equal to a predetermined threshold value.

In a further aspect of this disclosure, the instructions, when executed by the processor, may further cause the system, if the magnet is stopped from generating the first magnetic field, to sense, by the sensor, a third value of the detected magnetic field, determine a second difference between the first value of the detected magnetic field and the third value of the detected magnetic field, and, if the second difference is less than a predetermined threshold value, cause the magnet to resume generating the first magnetic field by the magnet.

In another aspect of this disclosure, the pole of the magnetic object nearest to the magnet may be indicated as being the same as the pole of the magnet depending upon whether the difference is positive or negative.

In yet another aspect of this disclosure, the magnet may be one of an electromagnet or an electropermanent magnet.

In a further aspect of this disclosure, wherein the sensor may be disposed adjacent to the magnet.

An aspect of this disclosure provides a vehicle including a magnetic bumper system. The vehicle comprises one or more bumpers, a processor, and a memory. The one or more bumpers are disposed on the vehicle. Each of the one or more bumpers includes a magnet and a sensor. The magnet is for selectively generating a first magnetic field. A first pole of the magnet faces the bumper and a second pole of the magnet faces away from the bumper. The sensor is for measuring a value of a detected magnetic field in an area near the magnet. The memory includes instructions stored thereon, which, when executed by the processor cause the vehicle to, for each of the one or more bumpers, generate the first magnetic field by the magnet, sense, by the sensor, a first value of the detected magnetic field in the area near the magnet, upon encountering a second magnetic field generated by a magnetic object in proximity to the magnet, sense, by the sensor, a second value of the detected magnetic field, determine a difference between the first value of the detected magnetic field and the second value of the detected magnetic field, if the difference indicates that a pole of the magnetic object nearest to the magnet is the same as the first pole of the magnet, continue to cause the first magnetic field to be generated by the magnet, and, if the difference indicates that the pole of the magnetic object nearest to the magnet is the same as the second pole of the magnet, stop the magnet from generating the first magnetic field.

In another aspect of this disclosure, the one or more bumpers may include at least one of a front bumper, a rear bumper, a driver side bumper, or a passenger side bumper.

In yet another aspect of this disclosure, each bumper of the one or more bumpers may cause a respective magnet of the bumper to generate the first magnetic field independent from each remaining bumper of the one or more bumpers.

In a further aspect of this disclosure, the magnet may not be caused to generate the first magnetic field while the vehicle is off.

In another aspect of this disclosure, the difference between the first value of the detected magnetic field and the second value of the detected magnetic field may correspond to a change in voltage.

In yet another aspect of this disclosure, the instructions, when executed by the processor may cause the system to stop the generation of the first magnetic field by the magnet if the difference between the first value of the detected magnetic field and the second value of the detected magnetic field is determined to be greater than or equal to a predetermined threshold value.

In a further aspect of this disclosure, the instructions, when executed by the processor, may further cause the vehicle, for each of the one or more bumpers, to, if the magnet is stopped from generating the first magnetic field, sense, by the sensor, a third value of the detected magnetic field, determine a second difference between the first value of the detected magnetic field and the third value of the detected magnetic field, and, if the second difference is less than a predetermined threshold value, cause the magnet to resume generating the first magnetic field by the magnet.

In another aspect of this disclosure, the pole of the magnetic object nearest to the magnet may be indicated as being the same as the pole of the magnet depending upon whether the difference is positive or negative.

In yet another aspect of this disclosure, the magnet may be one of an electromagnet or an electropermanent magnet.

In a further aspect of this disclosure, the sensor may be disposed adjacent to the magnet.

Further details and aspects of the present disclosure are described in more detail below with reference to the appended drawings.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
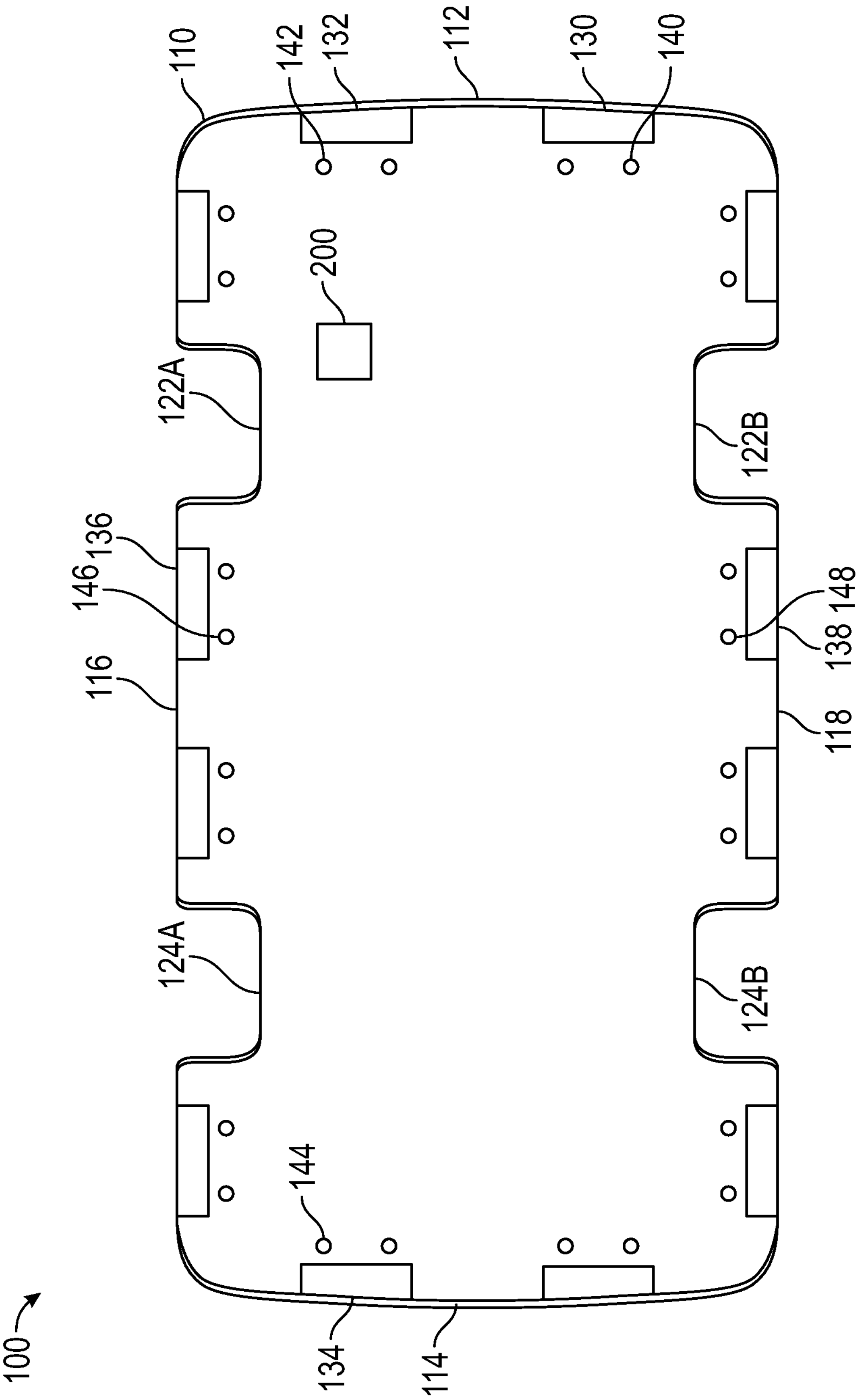
FIG. 1 illustrates top perspective, schematic view of an exemplary configuration of a magnetic bumper system as incorporated into a vehicle, including one or more magnets each generating a magnetic field, in accordance with aspects of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. As used herein, the term "vehicle" includes automobiles, motorcycles, marine vessels, aircraft, scooters, electric bikes, trucks, and the like.

Referring to FIG. 1, a magnetic bumper system 100 for vehicles is shown. Magnetic bumper system 100 generally includes at least one of a front bumper 112, a rear bumper 114, a driver side bumper 116, or a passenger side bumper 118 (generically, a bumper), as well as magnet(s) 130, sensor(s) 140, and a controller 200. If magnetic bumper system 100 is incorporated into a vehicle 110, as shown, magnets 130 and sensors 140 may be disposed inside of each of front bumper 112, rear bumper 114, driver side bumper 116, and passenger side bumper 118. Front bumper 112 may include front bumper magnet(s) 132 and front bumper sensor(s) 142. Rear bumper 114 may include rear bumper magnet(s) 134 and rear bumper sensor(s) 144. Driver side bumper 116 may include driver side bumper magnet(s) 136 and driver bumper side sensor(s) 146. Passenger side bumper 118 may include passenger side bumper magnet(s) 138 and passenger side bumper sensor(s) 148. Driver side bumper magnets 136 and sensors 146 may also be placed along the driver side front wheel well 122A and driver side rear wheel well 124A, and passenger side bumper magnets 138 and sensors 148 may also be placed along the passenger side front wheel well 122B and passenger side rear wheel well 124B.

Magnets 130 may be electromagnets, electropermanent magnets, or any type of magnet having a controllable magnetic field. Additionally, natural magnets such as lodestone are contemplated. The magnetic field of each of magnets 130 may be controlled (e.g., turned on or off) by controller 200, as will be later described. In aspects in which magnetic bumper system 100 is integrated into vehicle 110, controller 200 may not cause magnets 130 to produce magnetic fields until the vehicle is turned on. Each of magnets 130 is a dipole magnet, having a north pole and a south pole. Each of magnets 130 of magnetic bumper system 100 is arranged such that the same pole of each magnet 130 faces its respective bumper, and the opposite pole of each magnet 130 faces away from its respective bumper. For example, in vehicle 110, the south pole of front bumper magnet 132 may face toward front bumper 112, the south pole of rear bumper magnet 134 may face toward rear bumper 114, the south pole of driver side bumper magnet 136 may face toward driver side bumper 116, and the south pole of passenger side bumper magnet 138 may face toward passenger side bumper 118. Thus, magnetic bumper system 100, and therefore vehicle 110, behaves as having a south polarity. Therefore, by magnetic properties, magnetic bumper system 100 as installed in vehicle 110 will repel a south pole of a nearby or approaching magnetic object, preventing the magnetic object from coming into contact with magnetic bumper system 100. In aspects, magnets 130 may be individually controlled. For example, via controller 200, front bumper magnets 132 may be turned on and may therefore produce a magnetic field, while passenger side bumper magnets 138 may be turned off, and therefore cease to produce a magnetic field.

Sensors 140 may be capable of detecting and measuring magnetic fields. Sensors 140 may be magnetometers, Hall effect sensors, microelectromechanical systems (MEMS) compasses, or the like. While sensors 140 are shown disposed behind magnets 130 in FIG. 1, it is contemplated that sensors 140 may alternatively be disposed in front of magnets 130, such that each sensor 140 is seated between a magnet 130 and a respective bumper, or in another suitable configuration. As shown in FIG. 1, more than one sensor 140 may be designated to each magnet 130. Each of sensors 140 is located such that the sensor 140 may determine a value of a magnetic field associated with a magnet 130 and an area immediately surrounding the magnet 130. For example, a front bumper sensor 142 may detect a magnetic field produced by a front bumper magnet 132 and a surrounding area near front bumper 112. Based on the value of the magnetic field detected by a sensor 140, controller 200 may cause a corresponding magnet 130 to cease producing a magnetic field.

For example, front bumper magnet 132 may produce a front bumper magnetic field, with a south pole of front bumper magnet 132 facing toward front bumper 112. Front bumper sensor 142 may be an analog Hall effect sensor, and may provide an output of 2.5 volts when there is no magnetic field present (i.e., a neutral output). Encountering a south pole field would increase the output of front bumper sensor 142 toward 5 volts and encountering a north pole field would decrease the output toward 0 volts. Front bumper sensor 142 may detect a magnetic field of an area surrounding front bumper 112. Depending upon the proximity of front bumper sensor 142 to front bumper magnet 132, an initial value of the detected magnetic field (i.e., a voltage output) may be neutral or may be greater than 2.5 volts, indicating that front bumper sensor 142 detects the presence of the front bumper magnetic field generated by the south pole of front bumper magnet 132.

Upon front bumper 112 nearing a magnetic object, a subsequent value of the magnetic field would be detected by front bumper sensor 142. Controller 200 may determine a difference between the initial value of the detected magnetic field and the subsequent value of the detected magnetic field by subtracting the initial value of the detected magnetic field from the subsequent value of the detected magnetic field. If the difference is below a predetermined threshold value, front bumper magnet 132 may continue producing the front bumper magnetic field, as front bumper 112 would not be undesirably moved by small differences in the detected magnetic field. However, if the difference is above a predetermined threshold value, controller 200 may cause front bumper magnet 132 to cease generating the front bumper magnetic field. To aid in determining whether the predetermined threshold value has been met or exceeded, circuits such as high gain amplifier circuits and Schmitt triggers may be implemented into magnetic bumper system 100. In this instance, if the determined difference is positive, this would indicate that front bumper 112 is nearing a south pole of the magnetic object, and therefore, that front bumper magnet 132 should continue to produce the front bumper magnetic field to repel the magnetic object. If the determined difference is negative, this would indicate that front bumper 112 is nearing a north pole of the magnetic object, and therefore, that a force of attraction is present between front bumper 112 and the magnetic object. Controller 200 would then cause front bumper magnet 132 to stop producing the front bumper magnetic field. Alternatively, it is contemplated that upon detecting an attractive force between front bumper 112 and the magnetic object, controller 200 may cause front bumper magnet 132 to reverse polarity (i.e., power the north pole of front bumper magnet 132) such that the magnetic object is repelled from front bumper 112.

Other types of sensors 140 are contemplated to aid in accident prevention via magnetic bumper system 100. For example, sensor 140 may be a proximity sensor. In the above example, a proximity sensor might be used to cause controller 200 to power off certain magnets 130, for example, if a large force of attraction is present between a magnetic object and an area of the magnetic bumper system 100. In further examples, upon sensing that vehicle 110 has come within a specified range of another vehicle or object, controller 200 may cause magnets 130 to create a "pulse effect" to slow vehicle 110 down and remove vehicle 110 from the specified range of the other vehicle or object. It is contemplated that this "pulsing" of magnets 130 may reduce accidents even in situations where only vehicle 110 is equipped with magnetic bumper system 100. To create the "pulse effect," certain magnets 130 are powered on and off in intervals. For example, if a first front bumper sensor 142, indicating distance, detects that front bumper 112 of vehicle 110 has come within the specified range of another vehicle ahead, controller 200 may cause front bumper magnet 132 to stop producing the front bumper magnetic field. Simultaneously, rear bumper magnet 134 may be powered on and off to produce a rear bumper magnetic field and therefore attract surrounding magnetic objects, thus pulling vehicle 110 away from the vehicle ahead. In aspects, a first rear bumper sensor 144 may be a magnetic field sensor and may determine whether a detected magnetic field indicates an attractive force in an area surrounding rear bumper magnet 134. Should the first rear bumper sensor 144 fail to detect an attractive force, controller 200 may cause rear bumper magnet 132 to reverse polarity. The first rear bumper sensor 144 may ensure that the detected magnetic field remains below the predetermined threshold value. A second rear bumper sensor 144 may be a proximity sensor, and may ensure that, in pulling vehicle 110 away from the vehicle ahead, rear bumper 114 is not pulled within the specified range of an object behind vehicle 110.

In addition to preventing crashes, the "pulse effect" of magnets 130 may also be employed when vehicle 110 has entered a spin out due to hydroplaning or ice. In aspects, some sensors 140 may be directional sensors. Other sensors 140 may sense wheel speed, and may be disposed in any one of wheel wells 122A, 122B, 124A, and 124B. Further sensors 140 may detect g-force. At least one of the sensors 140 for direction, wheel speed, and g-force may send a signal to controller 200 when vehicle 110 has lost control and is spinning out. Upon determining a direction of the spinout, for example, clockwise or counter-clockwise, controller 200 may cause certain magnets 130 to produce or stop producing respective magnetic fields. For example, if vehicle 110 is spinning in a clockwise direction, controller 200 may cause driver side bumper magnets 136 to be powered on and off in intervals to produce a driver side bumper magnetic field and therefore attract surrounding magnetic objects to pull vehicle 110 out of a spin. In aspects, driver side bumper magnets 136 may be the only magnets used to pull vehicle 110 out of a clockwise spin. In further aspects, if vehicle 110 is spinning in a counter-clockwise direction, passenger side bumper magnets 138 may be the only magnets used to pull vehicle 110 out of a counter-clockwise spin.

In further examples, if vehicle 110 is spinning in a clockwise direction, controller 200 may use a combination of sensors 140, including proximity sensors, magnetic field sensors, and directional sensors, to locate a magnetic object to use to pull vehicle 110 out of a spin. Controller 200 may cause vehicle 110 to continuously monitor a location of surrounding magnetic objects. If vehicle 110 is traveling forward when vehicle 110 begins to spin out in a clockwise direction, and a magnetic object is located ahead and slightly to the left of vehicle 110 (e.g., at an eleven o'clock position of vehicle 110), controller 200 may cause magnets 130 at different locations on magnetic bumper system 100 to be powered on when in proximity to the magnetic object. The driver side bumper magnets 136 may be powered on when in proximity to the magnetic object, and, as vehicle 110 continues to rotate, the driver side bumper magnets 136 may be powered off, and the rear bumper magnets 134 may be powered on when in proximity to the magnetic object, and so on. In aspects, each magnet 130 may individually locate a magnetic object to which each magnet 130 is in closest proximity, and which is located in an area which would oppose the direction of the spin. Each magnet 130 may be powered on and off in intervals when in proximity to the respective magnetic object to pull vehicle 110 out of a spin. For example, as vehicle 110 spins in a clockwise direction, driver side bumper magnets 136 may be pulsed when in proximity to the closest magnetic object to the left of the driver side bumper magnets 136.

Also for spinout prevention, the pole of magnets 130 not facing a respective bumper may be powered. That is, upon detecting a spinout, and assuming that vehicle 110 generally produces a south pole magnetic field facing all bumpers, controller 200 may cause front bumper magnets 132, rear bumper magnets 134, driver side bumper magnets 136, and passenger side bumper magnets 138 to each power a respective north pole magnetic fields toward a center of vehicle 110, creating a "repelling effect." As each north pole magnetic field shares the same polarity, each north pole magnetic field would repel an adjacent north pole magnetic field, thus increasing the moment of inertia of vehicle 110, leading to a decrease in rotational speed of vehicle 110.

In aspects, a section of magnets 130 in addition to front bumper magnets 132, rear bumper magnets 134, driver side bumper magnets 136, and passenger side bumper magnets 138 may be disposed within vehicle 110 or on an exterior of vehicle 110. When disposed within vehicle 110, the additional section of magnets 130 may be surrounded by front bumper magnets 132, rear bumper magnets 134, driver side bumper magnets 136, and passenger side bumper magnets 138. The additional section of magnets 130 may instead surround front bumper magnets 132, rear bumper magnets 134, driver side bumper magnets 136, and passenger side bumper magnets 138. The additional section of magnets 130 may be disposed on a rail or the like, and the rail may deploy (or "drop down") during use. The additional magnets 130 may be powered by controller 200 during spinouts to enact the "repelling effect" instead of, or in addition to, front bumper magnets 132, rear bumper magnets 134, driver side bumper magnets 136, and passenger side bumper magnets 138, which may each be enacting the "pulse effect" or the "repelling effect."

It is contemplated that magnets 130 of vehicle 110 may also be used for moving vehicle 110 to safety should vehicle 110 become disabled. For example, magnets 130 may serve as a makeshift towing system to move vehicle 110 out of the roadway until further assistance may arrive. Front bumper magnets 132 may be powered such that an attractive force is determined by front bumper sensor 142 between vehicle 110 and another vehicle. Using the attractive force, vehicle 110 may be made to slowly follow the other vehicle as the other vehicle pulls over. Alternatively, rear bumper magnets 134 may be powered such that a repelling force is determined by rear bumper sensor 144 between vehicle 110 and another vehicle. Using the repelling force, the other vehicle may gently push vehicle 110 to the roadside. During each of these operations, a sensor 140 acting as a proximity sensor may ensure that the other vehicle does not come too close to vehicle 110.

Figure 2:
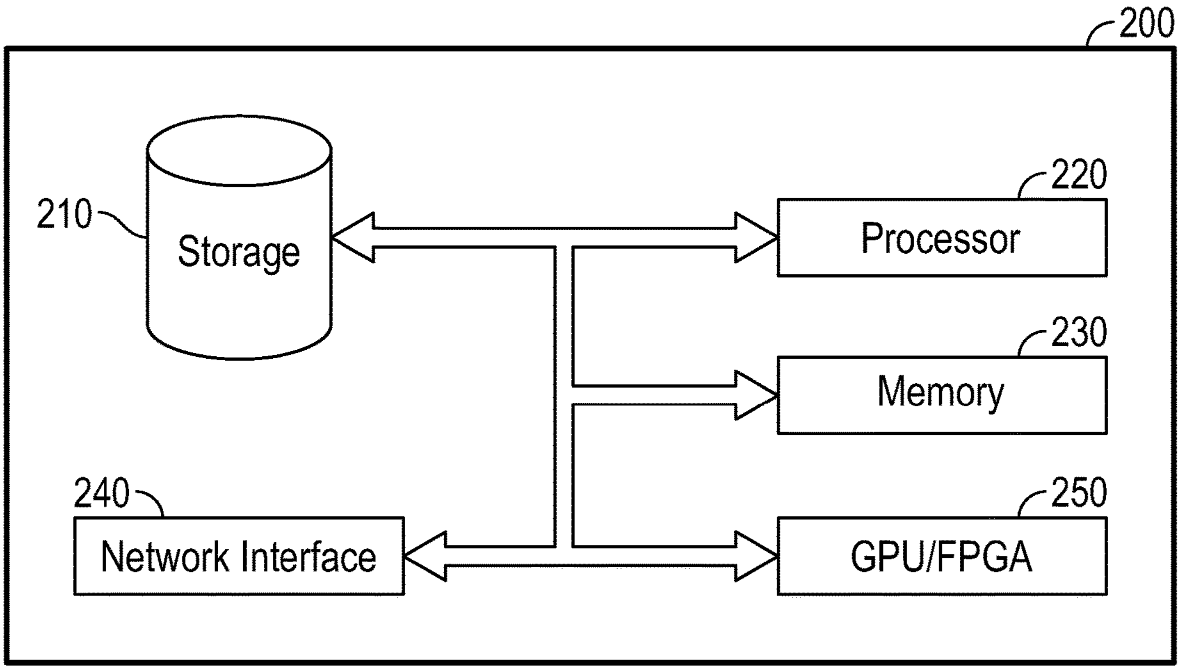
FIG. 2 is a block diagram of a computing device configured for use with the system of FIG. 1, in accordance with aspects of the present disclosure.

FIG. 2 shows that controller 200 includes a processor 220 connected to a computer-readable storage medium or a memory 230. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU) configured to display results, or a GUI on a display, a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

In aspects, controller 200 may be caused to communicate information regarding accidents or incidents to network interface 240. Network interface 240 may communicate to certain contacts, such as friends and family, automatically upon an accident occurring. As indicated by sensors 140. The communication may include information such as location data and status data of magnetic bumper system 100. The information may be saved in storage device 210, and may be accessible for purposes of insurance claims and communications, accident investigations, driving habits, and the like.

Figure 3:
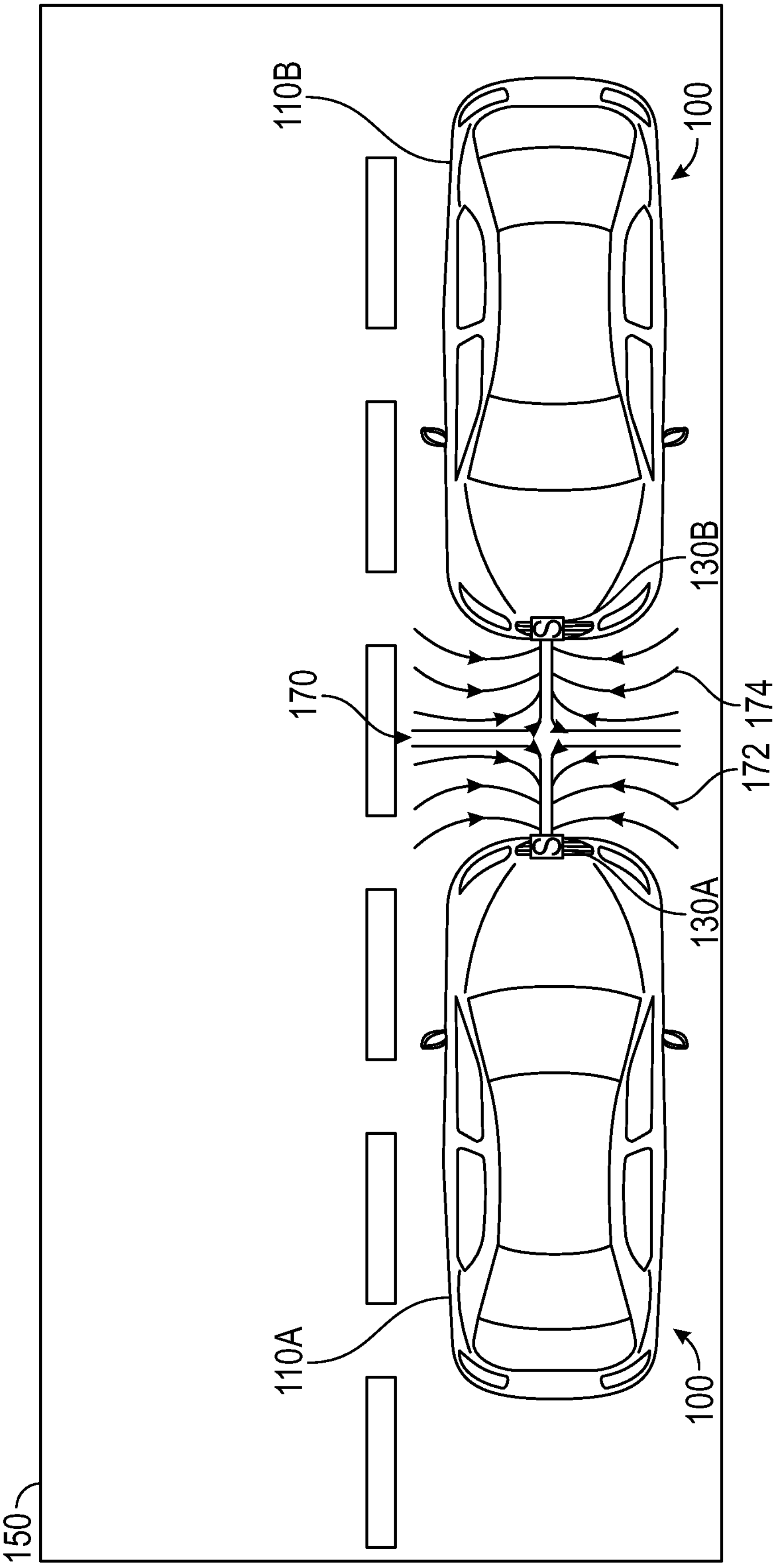
FIG. 3 shows an example in which the system of FIG. 1 is employed to prevent a collision by using the magnetic field generated by the one or more magnets of the vehicle, in accordance with aspects of the present disclosure.

FIG. 3 illustrates a use of magnetic bumper system 100 in preventing an automobile collision using repulsion between two like magnetic fields. In the scenario shown in FIG. 3, a first vehicle 110A and a second vehicle 110B each includes a respective magnetic bumper system 100. Via magnets 130A, magnetic bumper system 100 of first vehicle 110A produces a magnetic field 172, in particular, a south pole magnetic field. Magnetic bumper system 100 of second vehicle 110B also produces a south pole magnetic field, magnetic field 174, through magnets 130B. As first vehicle 110A and second vehicle 110B are driving in opposite directions along a road 150, second vehicle 110B might accidentally swerve into a path of first vehicle 110A. A first sensor 140 of first vehicle 110A and a second sensor 140 of second vehicle 110B would each measure an increase in a detected magnetic field 170 due to the proximity of magnetic fields 172 and 174. A first controller 200 of first vehicle 110A and a second controller 200 of second vehicle 110B would cause each of magnets 130A and 130B to continue to produce respective south pole magnetic fields 172 and 174. Because magnetic fields 172 and 174 share the same polarity, first vehicle 110A and second vehicle 110B would be magnetically repelled from one another, and prevented from coming into physical contact.

Figure 4:
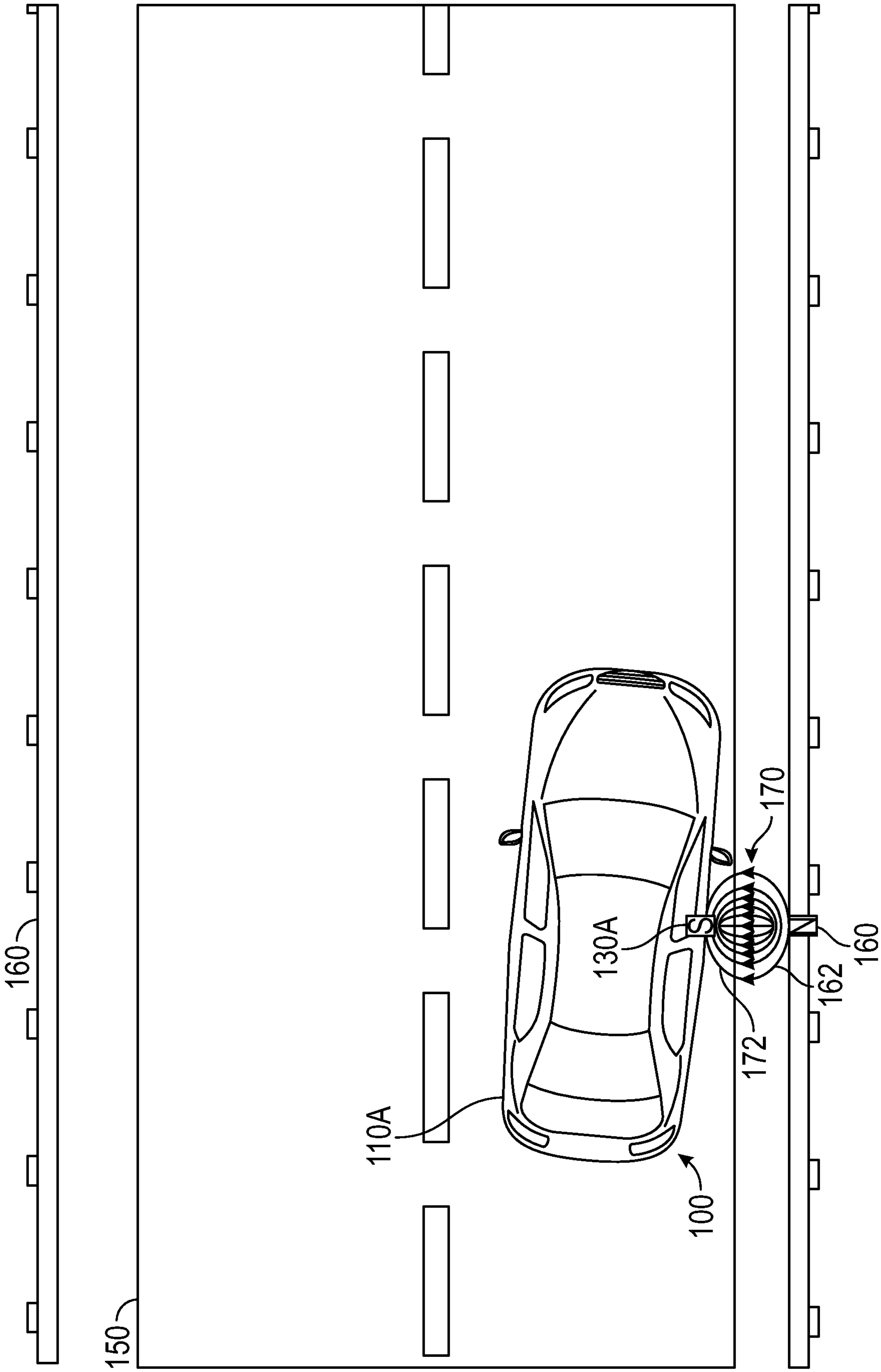
FIG. 4 illustrates an example in which the system of FIG. 1 is disengaged to prevent the magnetic field generated by the one or more magnets of the vehicle from inadvertently pulling the vehicle toward a magnetic object, in accordance with aspects of the present disclosure.

FIG. 4 demonstrates an instance in which an attractive force between a magnetic bumper system 100 of a first vehicle 110A and a magnetic object 160 causes magnetic bumper system 100 to disengage. In FIG. 4, first vehicle 110A is driving along road 150, which is bounded by road guard rails 160 (e.g., magnetic objects). As in FIG. 3, first vehicle 110A produces south pole magnetic field 172 using magnets 130A. However, here, road guard rails 160 produce a magnetic field 162, having a north polarity. Should first vehicle 110A drift toward road guard rail 160, magnetic field 172 and magnetic field 162, having opposing polarities, would cause an attractive force between first vehicle 110A and road guard rail 160. If magnets 130A were to continue to produce magnetic field 172, first vehicle 110A may be inadvertently pulled toward road guard rail 160. Upon the first sensor 140 of first vehicle 110A encountering magnetic field 162 and causing a difference in detected magnetic field 170 to reach a specified threshold value, the first controller 200 of magnetic bumper system 100 of first vehicle 110A would stop magnets 130A from producing magnetic field 172. The attractive force between first vehicle 110A and road guard rail 160 would then be abated, and first vehicle 110A could correct course back onto road 150. Upon the first sensor 140 moving out of range of magnetic field 162, the difference in detected magnetic field 170 would fall below the specified threshold value, and the first controller 200 may cause magnets 130A to resume producing magnetic field 172.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein.

Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A magnetic bumper system for vehicles, comprising:

a bumper;

a plurality of magnets, each selectively generating a respective first magnetic field, wherein a first pole of each magnet of the plurality of magnets faces the bumper and a second pole of each magnet of the plurality of magnets faces away from the bumper, wherein the first pole of each of the plurality of magnets is initially the same, and wherein each magnet of the plurality of magnets is caused to generate the respective first magnetic field independent from each remaining magnet of the plurality of magnets;

a plurality of first sensors, wherein each first sensor of the plurality of first sensors measures a voltage value of a detected magnetic field in an area near a respective magnet of the plurality of magnets, such that each magnet of the plurality of magnets is monitored by at least one first sensor of the plurality of first sensors;

a second sensor for sensing at least one of a direction, a speed, or a gravitational force;

a processor; and a memory, including instructions stored thereon, which, when executed by the processor cause the system to:

generate the first magnetic field by a magnet of the plurality of magnets;

sense, by a first sensor of the plurality of first sensors, a first voltage value of the detected magnetic field in the area near the magnet;

upon encountering a second magnetic field generated by a magnetic object in the area in proximity to the magnet, sense, by the first sensor, a second voltage value of the detected magnetic field;

determine a voltage difference between the first voltage value of the detected magnetic field and the second voltage value of the detected magnetic field;

if the voltage difference indicates that a pole of the magnetic object nearest to the first pole of the magnet is the same as the first pole of the magnet, continue to cause the first magnetic field to be generated by the magnet;

if the voltage difference indicates that the pole of the magnetic object nearest to the first pole of the magnet is different from the first pole of the magnet, stop the magnet from generating the first magnetic field and:

sense, by the first sensor, a third voltage value of the detected magnetic field;

determine a second voltage difference between the first voltage value of the detected magnetic field and the third voltage value of the detected magnetic field; and if the second voltage difference is less than a predetermined threshold value, cause the magnet to resume generating the first magnetic field by the magnet;

determine, based on a measurement from the second sensor, that the vehicle is in a spin out;

determine, based on the measurement from the second sensor, a direction of the spin out; and generate, by a group of magnets of the plurality of magnets that are opposite the direction of the spin out, the first magnetic field.

2. The system of claim 1, wherein the instructions, when executed by the processor cause the system to stop the generation of the first magnetic field by the magnet if the voltage difference between the first voltage value of the detected magnetic field and the second voltage value of the detected magnetic field is determined to be greater than or equal to a predetermined threshold value.

3. The system of claim 1, wherein the pole of the magnetic object nearest to the magnet is indicated as being the same as the pole of the magnet depending upon whether the voltage difference is positive or negative.

4. The system of claim 1, wherein each magnet of the plurality of magnets is one of an electromagnet or an electropermanent magnet.

5. The system of claim 1, wherein one or more first sensors of the plurality of first sensors are disposed adjacent to each magnet of the plurality of magnets.

6. A vehicle including a magnetic bumper system, comprising:

one or more bumpers disposed on the vehicle, each of the one or more bumpers including:

a plurality of magnets, each selectively generating a respective first magnetic field, wherein a first pole of each magnet of the plurality of magnets faces the bumper and a second pole of each magnet of the plurality of magnets faces away from the bumper, wherein the first pole of each of the plurality of magnets is initially the same, and wherein each magnet of the plurality of magnets is caused to generate the respective first magnetic field independent from each remaining magnet of the plurality of magnets; and a plurality of first sensors, wherein each first sensor of the plurality of first sensors measures a voltage value of a detected magnetic field in an area near a respective magnet of the plurality of magnets, such that each magnet of the plurality of magnets is monitored by at least one first sensor of the plurality of first sensors;

a second sensor for sensing at least one of a direction, a speed, or a gravitational force;

a processor; and a memory, including instructions stored thereon, which, when executed by the processor cause the vehicle to, for each of the one or more bumpers:

generate the first magnetic field by a magnet of the plurality of magnets;

sense, by a first sensor of the plurality of first sensors, a first voltage value of the detected magnetic field in the area near the magnet;

upon encountering a second magnetic field generated by a magnetic object in proximity to the magnet, sense, by the first sensor, a second voltage value of the detected magnetic field;

determine a voltage difference between the first voltage value of the detected magnetic field and the second voltage value of the detected magnetic field;

if the voltage difference indicates that a pole of the magnetic object nearest to the first pole of the magnet is the same as the first pole of the magnet, continue to cause the first magnetic field to be generated by the magnet;

if the voltage difference indicates that the pole of the magnetic object nearest to the first pole of the magnet is different from the first pole of the magnet, stop the magnet from generating the first magnetic field, and:

sense, by the first sensor, a third voltage value of the detected magnetic field;

determine a second voltage difference between the first voltage value of the detected magnetic field and the third voltage value of the detected magnetic field; and if the second voltage difference is less than a predetermined threshold value, cause the magnet to resume generating the first magnetic field by the magnet;

determine, based on a measurement from the second sensor, that the vehicle is in a spin out;

determine, based on the measurement from the second sensor, a direction of the spin out; and generate, by a group of magnets of the plurality of magnets that are opposite the direction of the spin out, the first magnetic field.

7. The vehicle of claim 6, wherein the one or more bumpers includes at least one of a front bumper, a rear bumper, a driver side bumper, or a passenger side bumper.

8. The vehicle of claim 6, wherein each magnet of the plurality of magnets is not caused to generate the first magnetic field while the vehicle is off.

9. The vehicle of claim 6, wherein the instructions, when executed by the processor cause the system to stop the generation of the first magnetic field by the magnet if the voltage difference between the first voltage value of the detected magnetic field and the second voltage value of the detected magnetic field is determined to be greater than or equal to a predetermined threshold value.

10. The vehicle of claim 6, wherein the pole of the magnetic object nearest to the magnet is indicated as being the same as the pole of the magnet depending upon whether the voltage difference is positive or negative.

11. The vehicle of claim 6, wherein each magnet of the plurality of magnets is one of an electromagnet or an electropermanent magnet.

12. The vehicle of claim 6, wherein one or more first sensors of the plurality of first sensors are disposed adjacent to each magnet of the plurality of magnets.

13. The system of claim 1, further comprising at least one of a high gain amplifier circuit or a Schmitt trigger.

14. A magnetic bumper system for vehicles, comprising:

a bumper;

a plurality of magnets, each selectively generating a respective first magnetic field, wherein a first pole of each magnet of the plurality of magnets faces the bumper and a second pole of each magnet of the plurality of magnets faces away from the bumper, wherein the first pole of each of the plurality of magnets is initially the same, and wherein each magnet of the plurality of magnets is caused to generate the respective first magnetic field independent from each remaining magnet of the plurality of magnets;

a plurality of first sensors, wherein each first sensor of the plurality of first sensors measures a voltage value of a detected magnetic field in an area near a respective magnet of the plurality of magnets, such that each magnet of the plurality of magnets is monitored by at least one first sensor of the plurality of first sensors;

a second sensor for sensing at least one of a direction, a speed, or a gravitational force;

a processor; and a memory, including instructions stored thereon, which, when executed by the processor cause the system to:

generate the first magnetic field by a magnet of the plurality of magnets;

sense, by a first sensor of the plurality of first sensors, a first voltage value of the detected magnetic field in the area near the magnet;

upon encountering a second magnetic field generated by a magnetic object in the area in proximity to the magnet, sense, by the first sensor, a second voltage value of the detected magnetic field;

determine a voltage difference between the first voltage value of the detected magnetic field and the second voltage value of the detected magnetic field;

if the voltage difference indicates that a pole of the magnetic object nearest to the first pole of the magnet is the same as the first pole of the magnet, continue to cause the first magnetic field to be generated by the magnet;

if the voltage difference indicates that the pole of the magnetic object nearest to the first pole of the magnet is different from the first pole of the magnet, cause the magnet to reverse polarity and generate a third magnetic field;

determine, based on a measurement from the second sensor, that the vehicle is in a spin out;

determine, based on the measurement from the second sensor, a direction of the spin out; and generate, by a group of magnets of the plurality of magnets that are opposite the direction of the spin out, the first magnetic field.

15. The system of claim 1, wherein the group of magnets of the plurality of magnets that are opposite the direction of the spin out are caused to generate the first magnetic field in predetermined time intervals.

16. The system of claim 1, wherein the instructions further cause the system to power one or more magnets of the plurality of magnets such that magnetic fields are directed toward a center of the vehicle to create a repelling effect between the one or more magnets.

17. The system of claim 1, wherein the instructions further cause the system to locate a magnetic object positioned to oppose a direction of a spinout and selectively activate one or more magnets of the plurality of magnets in proximity to the magnetic object.

18. The system of claim 1, wherein the instructions further cause the system to generate a pulse effect by powering one or more magnets of the plurality of magnets on and off in intervals.

19. The system of claim 1, wherein the plurality of magnets are individually controlled such that one or more magnets generate a magnetic field while one or more other magnets do not generate a magnetic field.

20. The system of claim 1, further comprising an additional section of magnets disposed on a deployable rail.

* * * * *